(12) United States Patent
Mathews (10) Patent No.: US 11,839,790 B2
(45) Date of Patent: Dec. 12, 2023

(54) SWEAT GRIP

(71) Applicant: Lisa Mathews, Martinez, CA (US)

(72) Inventor: Lisa Mathews, Martinez, CA (US)

( * ) Notice: Subject to any disclaimer, the term of this patent is extended or adjusted under 35 U.S.C. 154(b) by 0 days.

(21) Appl. No.: 17/395,374

(22) Filed: Aug. 5, 2021

(65) Prior Publication Data
US 2022/0080254 A1   Mar. 17, 2022

Related U.S. Application Data (63) Continuation-in-part of application No. 15/154,860, filed on May 13, 2016, now abandoned.

(60) Provisional application No. 62/162,168, filed on May 15, 2015.

(51) Int. Cl.
*A63B 21/00* (2006.01)

(52) U.S. Cl.
CPC ...... *A63B 21/4035* (2015.10); *A63B 2209/10* (2013.01); *A63B 2225/09* (2013.01)

(58) Field of Classification Search
CPC ............ A63B 21/4035; A63B 2209/10; A63B 2225/09
See application file for complete search history.

(56) References Cited

U.S. PATENT DOCUMENTS

| | | | | |
|---|---|---|---|---|
| 4,131,952 A | * | 1/1979 | Brenning, Jr. ....... | A41D 19/015 2/124 |
| 5,469,601 A | * | 11/1995 | Jackson ................... | B25G 1/10 D8/322 |
| 7,220,195 B1 | * | 5/2007 | Cronin ................... | A63B 60/10 473/568 |
| 8,235,872 B2 | * | 8/2012 | Perry ................. | A63B 21/4035 482/93 |
| 8,961,372 B2 | * | 2/2015 | Hasta ..................... | A47G 9/062 5/420 |
| 9,095,971 B1 | * | 8/2015 | Douglas .................. | A47J 45/10 |
| 9,408,425 B2 | * | 8/2016 | Koga ....................... | D06N 3/10 |
| 2004/0050205 A1 | * | 3/2004 | Putnam ................. | B62K 21/26 74/558 |
| 2009/0000060 A1 | * | 1/2009 | Edens ................ | A63B 21/4017 16/110.1 |
| 2012/0164202 A1 | * | 6/2012 | Harris ................... | D06M 15/21 422/243 |
| 2013/0022792 A1 | * | 1/2013 | Antonini ................ | C08J 7/0427 428/411.1 |
| 2013/0171432 A1 | * | 7/2013 | Dandapure ............. | B32B 25/10 428/196 |
| 2014/0274614 A1 | * | 9/2014 | Newman ............ | A63B 21/4035 482/139 |

OTHER PUBLICATIONS

Electrotechnik ; Website: https://www.electrotechnik.net/2011/02/electrical-gloves.html (Year: 2011).*

* cited by examiner

*Primary Examiner* — Megan Anderson
(74) *Attorney, Agent, or Firm* — West & Associates, A PC; Stuart J. West; Charlotte Rodeen-Dickert (57) ABSTRACT

A sweat grip comprising a main body with a sweat-absorbent side and a grip side with a higher coefficient of friction than the sweat-absorbent side and having antimicrobial properties. The sweat grip can be wrapped around an object such as the handle of an exercise machine, such that the sweat grip can enhance a user's grip on the object and can at least partially absorb the user's sweat without transferring sweat to the object.

4 Claims, 9 Drawing Sheets

SWEAT GRIP

CLAIM OF PRIORITY

This application is a Continuation-In-Part of U.S. Utility application Ser. No. 15/154,860, filed May 16, 2016 which claims priority under 35 U.S.C. § 119(e) from earlier filed U.S. Provisional Application Ser. No. 62/162,168, filed May 15, 2016, the complete contents of each of which are hereby incorporated by reference.

BACKGROUND

Field of the Invention

The present disclosure relates to the field of exercise equipment accessories, particularly a sweat-absorbent grip that can be attached to a handle of an exercise machines or other equipment.

Background

Using exercise machines and equipment is a popular way of getting and staying in shape. However, sweat can often be transferred to exercise equipment when a user holds it while working out. Sweat can make the equipment slick and harder to hold on to. Additionally, in gyms or other situations where multiple users routinely use the same pieces of equipment, sweat left on equipment can be unsanitary and lead to sweat and/or germ transmission to subsequent users of the equipment.

What is needed is a sweat grip that can be attached around the handle of a piece of exercise equipment. The sweat grip should be at least partially absorbent, such that the sweat grip can absorb sweat instead of allowing the sweat to be transferred to the exercise equipment. Such a sweat grip can accordingly increase a user's grip on exercise equipment while in use. The sweat grip should be detachable from exercise equipment when a user is finished with the equipment, such that subsequent users can use the equipment without the risk of touching sweat from the previous user.

DETAILED DESCRIPTION

Figure 1:
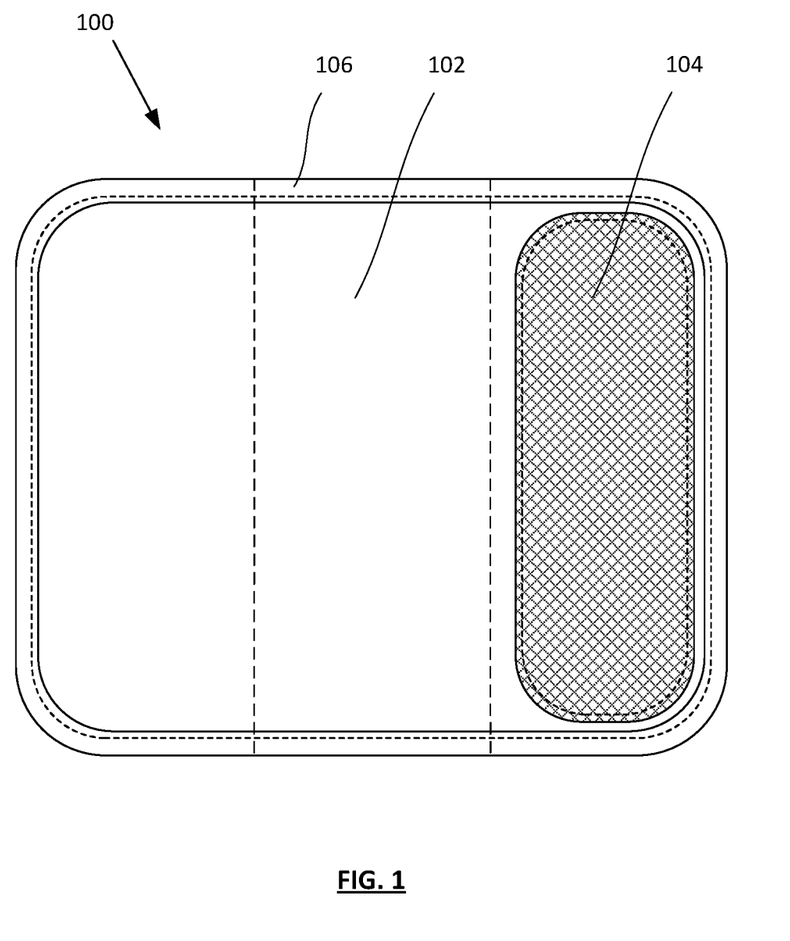
FIG. 1 depicts a front view of an embodiment of a sweat grip in an open position.

FIG. 1 depicts a front view of an embodiment of a sweat grip 100 in an open position. A sweat grip 100 can comprise a main body 102 and one or more fasteners 104. In some embodiments the sweat grip 100 can further comprise a border 106 extending around some or all of the peripheral edges of the main body 102.

Figure 2:
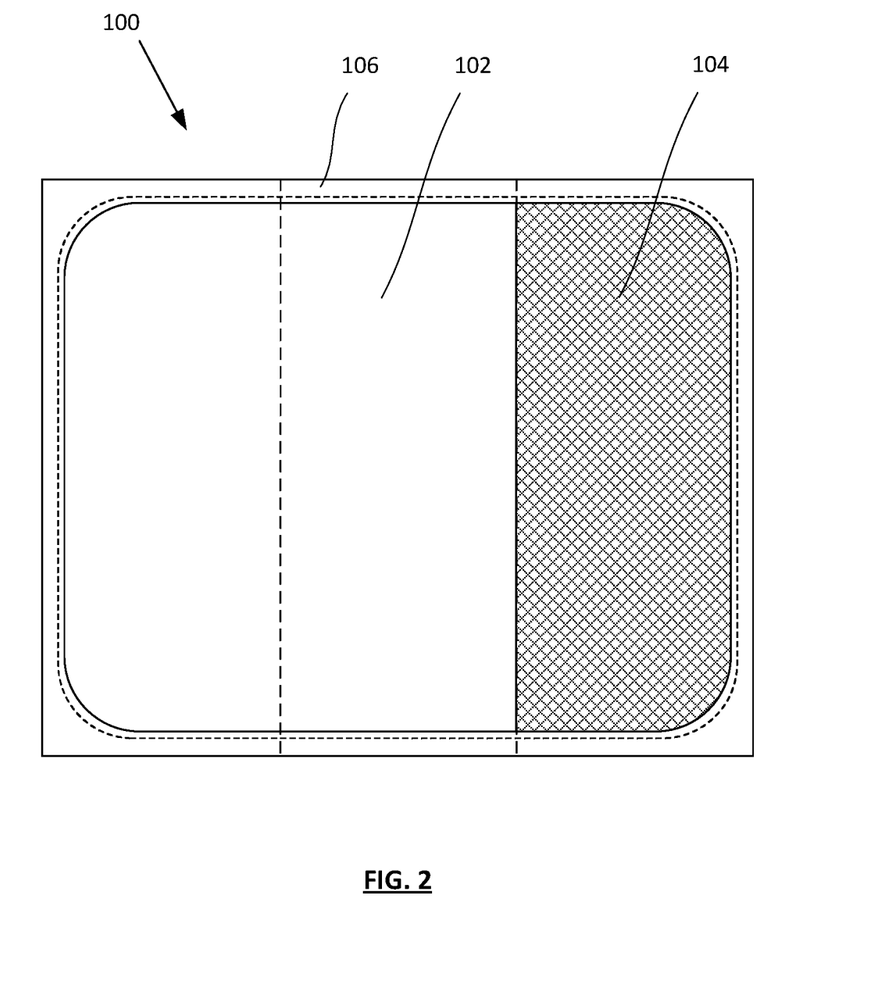
FIG. 2 depicts a front view of an alternate embodiment of a sweat grip in an open position.

The main body 102 can comprise one or more pieces of flexible material, such that it can be substantially planar when in the open position shown in FIG. 1, and be flexed to wrap or fold it around another object as will be described below. In some embodiments the main body 102 and/or border 106 can be substantially rectangular with rounded corners, as shown in FIG. 1. In other embodiments the main body 102 and/or border 106 can have a rectangular shape with sharp corners, as shown in FIG. 2. In still other embodiments, the main body 102 and/or border 106 can be square, circular, ovoid, triangular, polygonal, irregular, or have any other desired shape.

The main body 102 can have two opposing sides or faces, an absorbent side and a grip side. The absorbent side can have a material that substantially absorbs fluids such as sweat. The grip side can have a higher coefficient of friction than the absorbent side, such that it resists motion against other objects more than the absorbent side.

Figure 3:
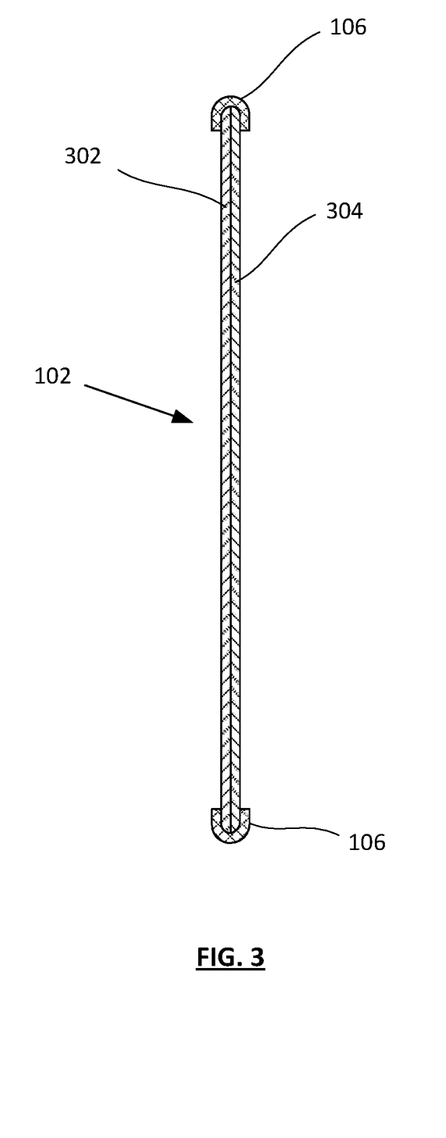
FIG. 3 depicts a side cross-sectional view of an embodiment of a sweat grip having a first panel and a second panel positioned back to back.

In some embodiments, the main body 102 can comprise a first panel 302 and a second panel 304 positioned back-to-back, as shown in the side cross-sectional view of FIG. 3. The first panel 302 can be the absorbent side of the main body 102, and can comprise an absorbent cloth or material such as chamois leather, microfiber cloth, or other natural or synthetic fibers. The second panel 304 can be the grip side of the main body 102, and can comprise a textured material and/or a material with a higher coefficient of friction than the first panel 302. By way of a non-limiting example, the second panel 304 can comprise silicone, neoprene, foam, rubber, and/or any other anti-slip or non-skid material.

In some of these embodiments, the border 106 can join the edges of the first panel 302 and second panel 304 together using stitching, fusing, adhesives, and/or any other connection mechanism. In other embodiments adjoining faces of the first panel 302 and second panel 304 can be coupled together with stitching, fusing, adhesives, and/or any other connection mechanism.

Figure 4:
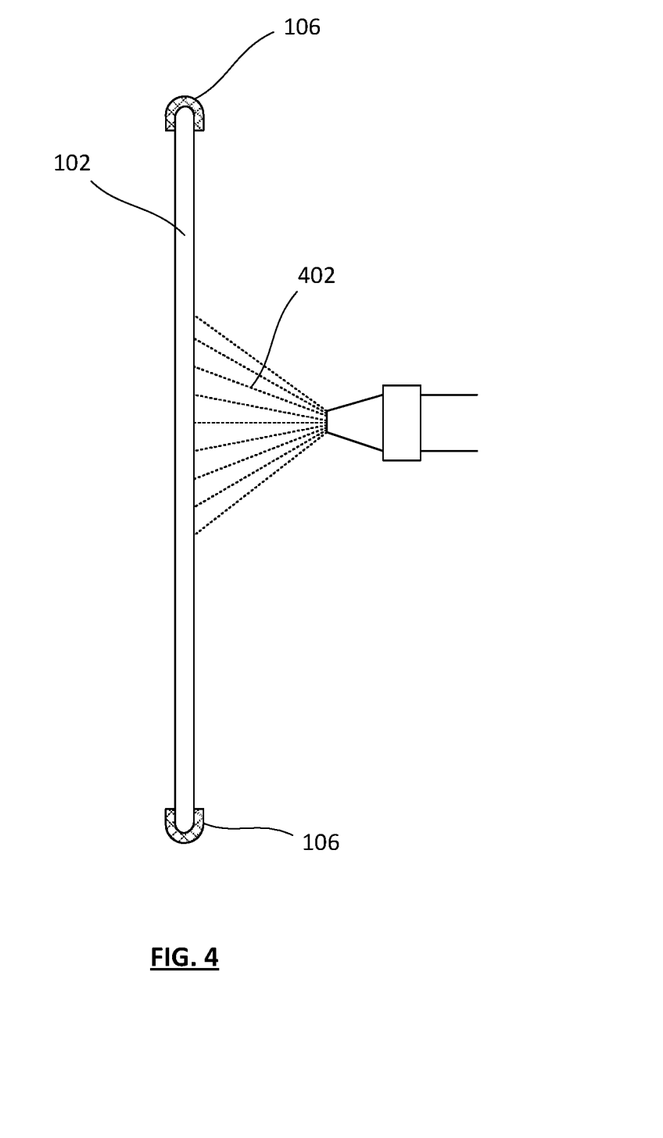
FIG. 4 depicts a side cross-sectional view of an embodiment of a sweat grip having an anti-slip and/or non-skid substance applied to one side.

In other embodiments, the main body 102 can comprise a full panel of absorbent material and an anti-slip and/or non-skid substance 402 can be applied to the surface of one side, as shown in FIG. 4. By way of a non-limiting example, in some embodiments liquid silicone can be applied and spread across one side of the main body 102, such that the side with liquid silicone can be the grip side of the main body 102.

Figure 5:
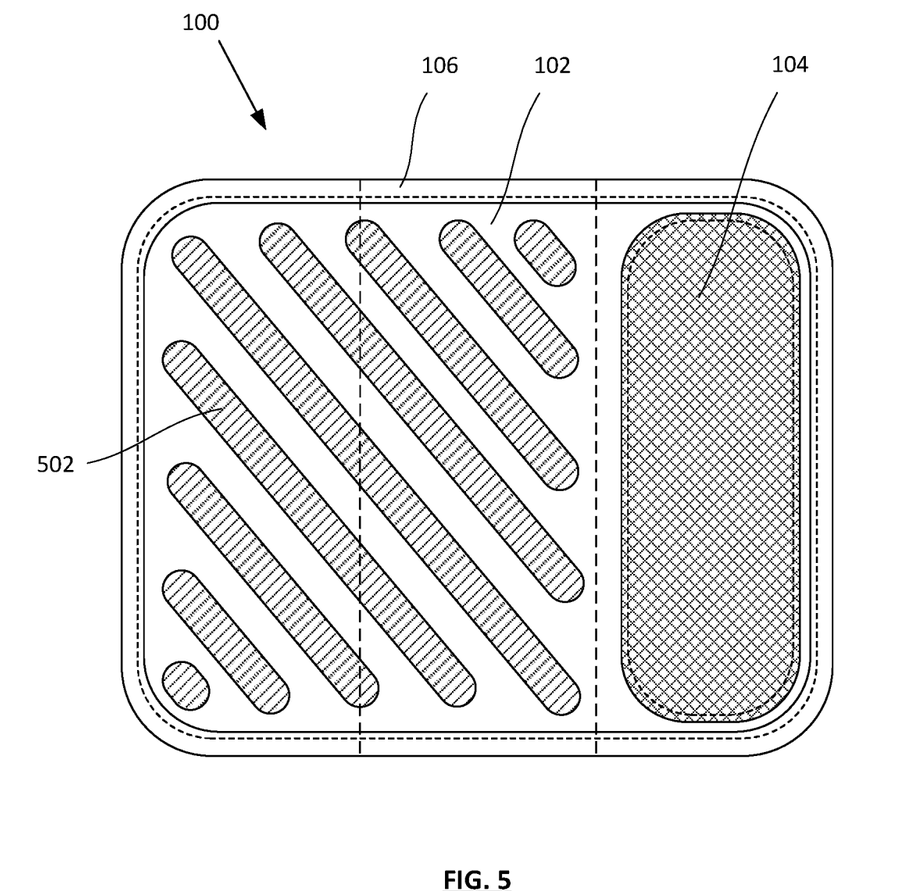
FIG. 5 depicts a view of an embodiment of a sweat grip having strips of an anti-slip and/or non-skid material coupled with one side.

In still other embodiments, the main body 102 can comprise a full panel of absorbent material having smaller sections of anti-slip and/or non-skid material 502 coupled with one side with adhesives, stitching, fusing, or any other coupling mechanism. The side of the full panel of absorbent material with the sections of anti-slip and/or non-skid material 502 can be the grip side, while the other side can be the absorbent side. By way of a non-limiting example, FIG. 5 depicts an embodiment having strips of silicone coupled with a panel of absorbent material on the grip side of the main body 102.

One or more fasteners 104 can be coupled with the absorbent side and/or grip side of the main body 102. Fasteners 104 can be hook and loop fasteners, snaps, straps, buttons, and/or any other type of connector. By way of a non-limiting example, FIGS. 1 and 2 depict embodiments in which substantially a third of a side of the main body 102 is covered with an area of hook and loop fasteners 104. In some embodiments the fasteners 104 on one side of the main body 102 can be configured to selectively couple with corresponding fasteners 104 on the opposing side of the main body 102. In alternate embodiments fasteners 104 on one side of the main body 102 can be configured to selectively couple directly with material on the opposing side of the main body 102. By way of a non-limiting example, the fasteners 104 can be the hook portions of hook and loop fasteners positioned on the grip side of the main body 102, and the main body 102 can be made of a material to which the hooks stick on the absorbent side.

The border 106 can be made of plastic, vinyl, leather, or any other desired material. The border 106 be coupled with the main body 102 using stitching, fusing, adhesives, and/or any other connection mechanism.

In use, a sweat grip 100 can be wrapped, flexed and/or folded over on itself and the fasteners 104 can be used to secure the sweat grip 100 in a closed configuration. In some embodiments the main body 102 can be folded in thirds, with the two exterior thirds being held against each other by fasteners 104 behind the middle third.

Figure 6A:
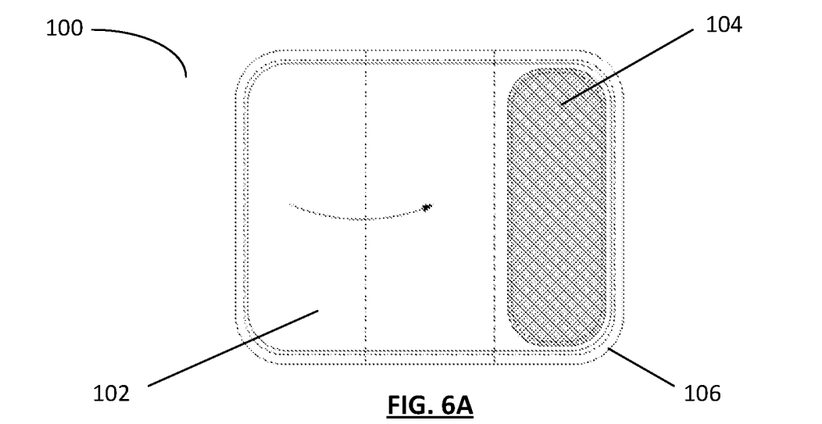
FIGS. 6A-6D depict the transformation of a sweat grip from an open configuration to a closed configuration.
Figure 6B:
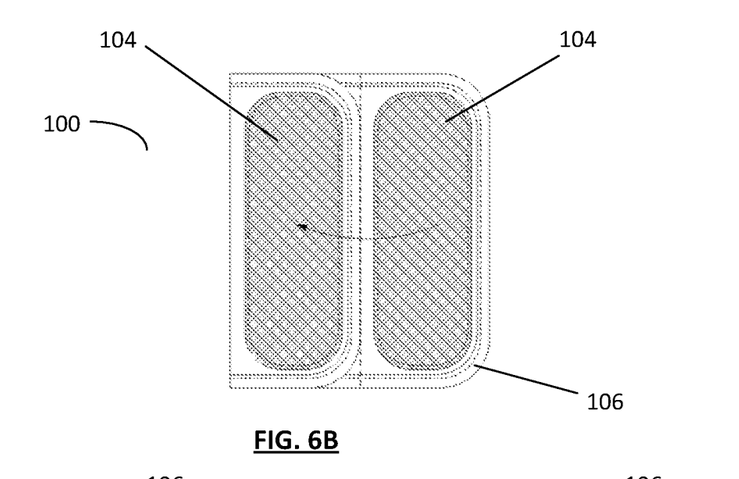
Figure 6C:
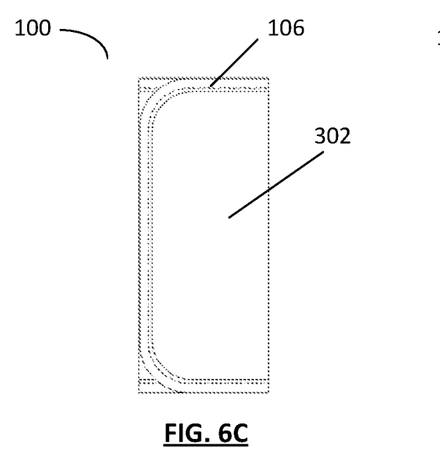
Figure 6D:
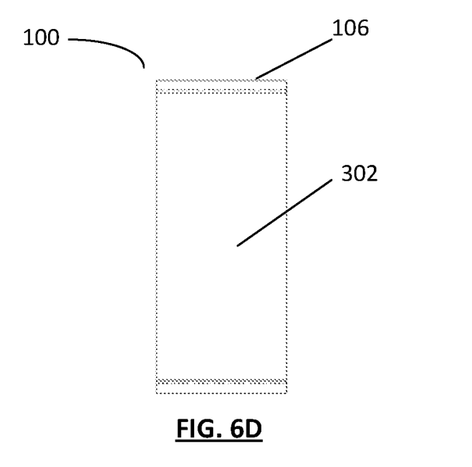

By way of a non-limiting example, FIGS. 6A-6D depict the transformation of a sweat grip 100 from its open configuration to its closed configuration. As shown in FIG. 6A, a first exterior third of the main body 102 can be folded inward from a substantially planar open configuration, and the second exterior third of the main body 102 can then be folded inward such that fasteners 104 on opposing sides of the main body 102 can be coupled with one another. In alternate embodiments fasteners 104 on one exterior third of the main body can be coupled directly with the main body 102, as discussed above. FIGS. 6C and 6D depict front and back views of the sweat grip 100 in its closed configuration.

Figure 7:
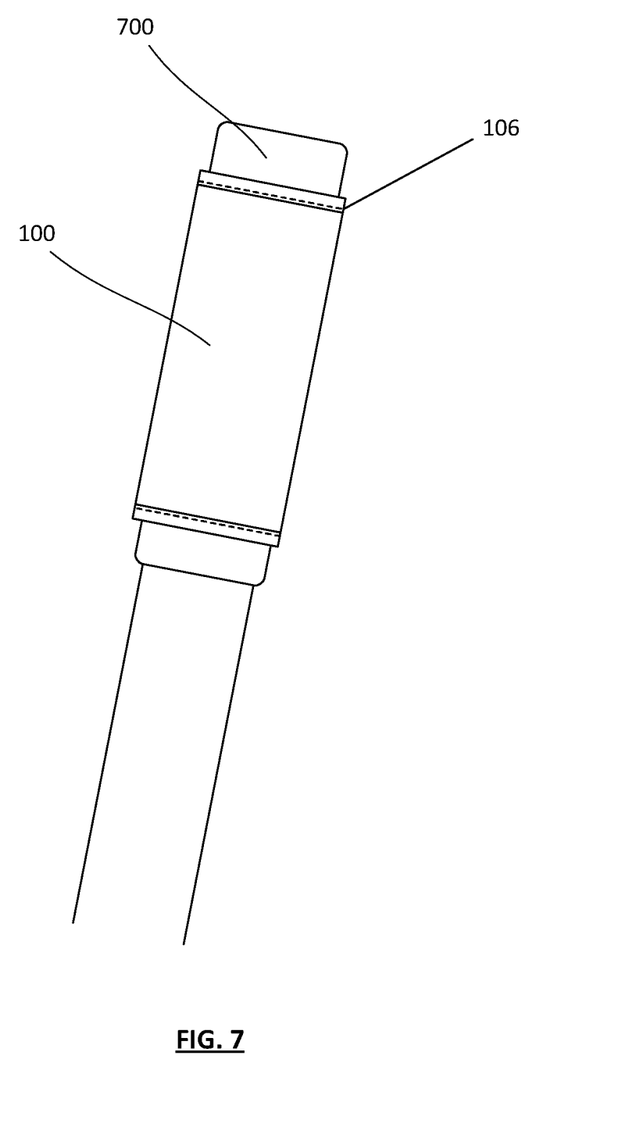
FIG. 7 depicts an embodiment of a sweat grip secured around an object.

As shown in FIG. 7, the sweat grip 100 can be wrapped, flexed, and/or folded and secured around an object 700, such as a handle of an exercise machine. The grip side of the main body 102 can be placed against the object 700, such that the absorbent side faces outward. When the sweat grip is secured around an object 700 with the grip side of the main body 102 positioned against the object 700, a user can grasp the absorbent side of the main body 102 such that friction between the grip side and the object 700 assists the user in maintaining the user's grip on the object 700. If the user sweats while grasping the absorbent side, the sweat can be at least partially absorbed by the absorbent side. Sweat absorption by the absorbent side can also assist in maintaining the user's grip on the object 700 and/or preventing sweat transmission to the object 700. When the user is finished using the object 700, the user can remove the sweat grip 100 from the object 700, thereby also removing the sweat absorbed by the absorbent side such that it does not remain on the object 700.

Figure 8A:
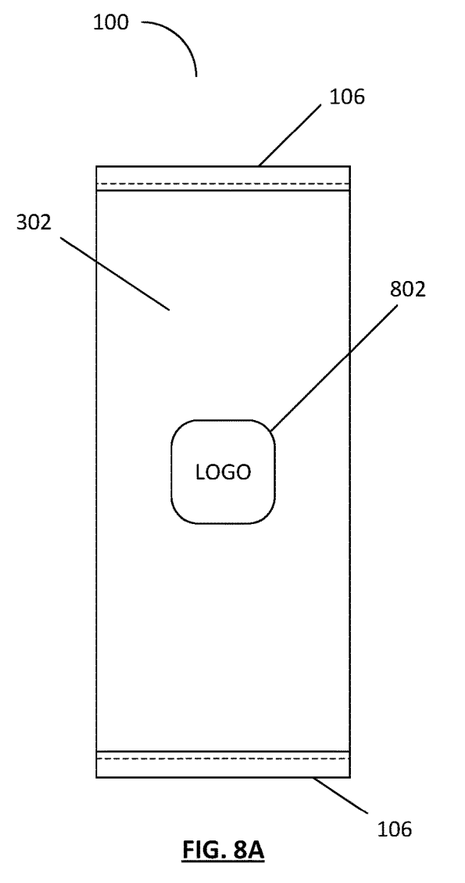
FIGS. 8A-8B depict embodiments with designs positioned on the exterior of an embodiment of a sweat grip when it is in a closed configuration.
Figure 8B:
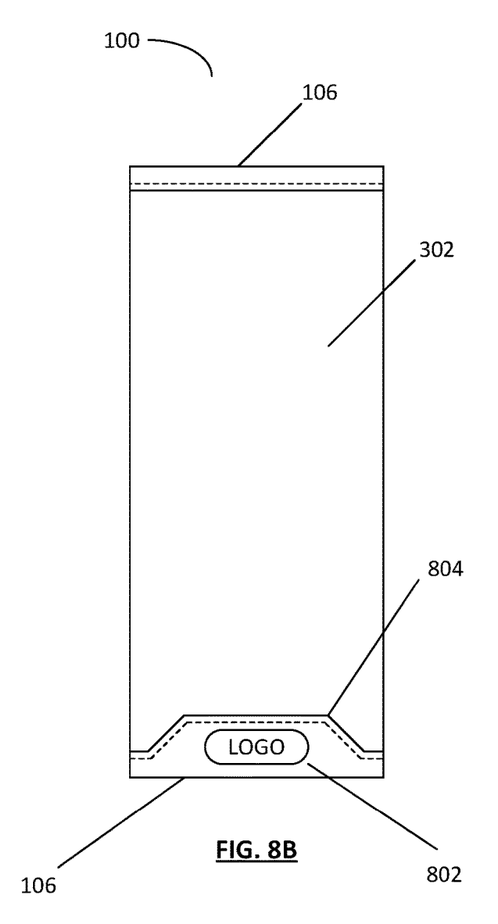

In some embodiments, one or more logos or other designs/indicia 802 can be displayed on the main body 102 and/or in association with the border 106. In some embodiments, the indicia 802 can be positioned on the absorbent side 302, such that they are visible when the sweat grip 100 is attached around an object 700 as depicted in FIGS. 8A-8B. In some embodiments, the border 106 can be shaped with one or more protrusions 804 to increase the surface area available for logos and other designs. In some embodiments, the indicia 802 can be integral with the border 106 and/or integral with the absorbent side 302. However, in alternate embodiments, the indicia 802 can be bonded with the border 106 and/or bonded with the absorbent side 302.

Figure 9A:
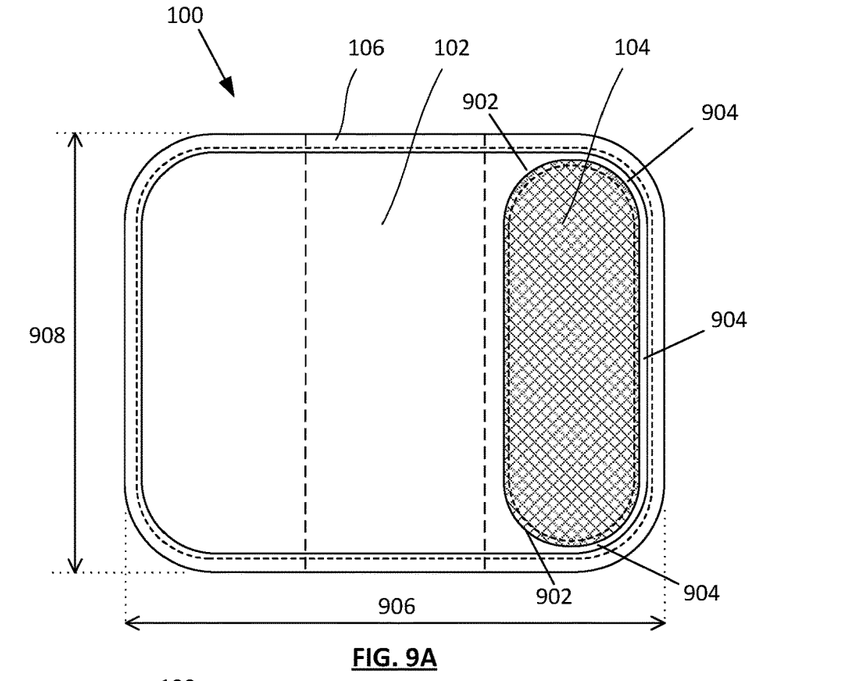
FIGS. 9A and 9B depict further embodiment of the sweat grip.

As depicted in FIG. 9A, in some embodiments, the one or more fasteners 104 can have a rounded rectangular shape having two parallel or substantially parallel elongate sides and semi-circular rounded ends. However, in alternate embodiments the one or more fasteners 104 can have any known convenient and/or desired shape such that at least a portion of the perimeter of the one or more fasteners 104 is complimentary in shape relative to the border 106.

As depicted in FIG. 9A, in some embodiments, the one or more fasteners 104 can be selectively positioned relative to the first panel 302 such that the one more fasteners 104 are not in contact with the border 106. That is, in the embodiment depicted in FIG. 9A, there is a gap 904 between the edge of the one or more fasteners 104 and the border 106.

Figure 9B:
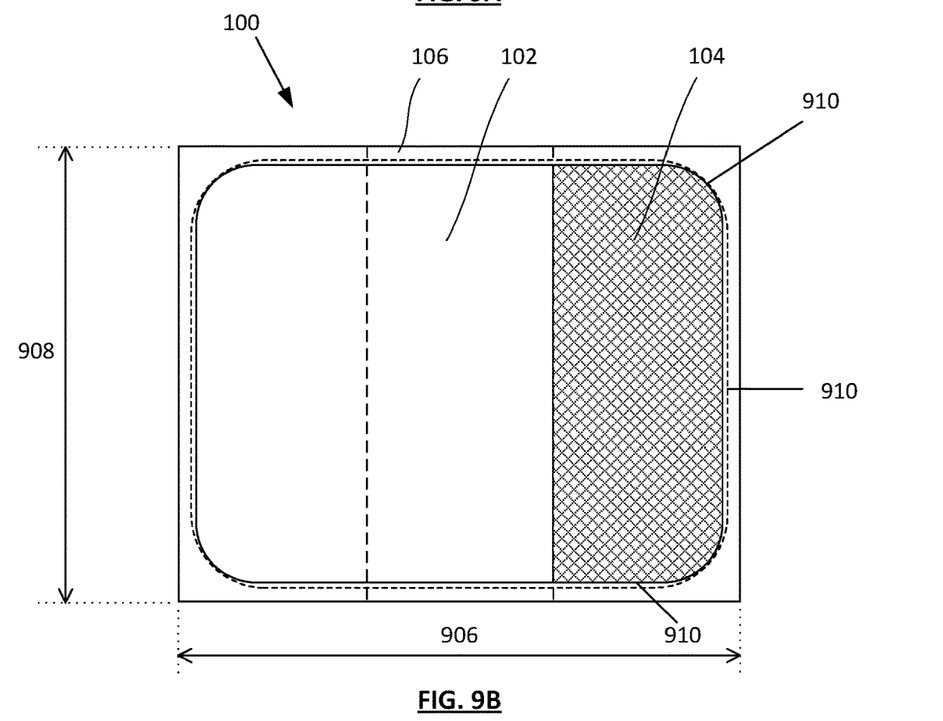

As depicted in FIGS. 9A and 9B, in some embodiments, a sweat grip 100 can have a length 906 substantially in the range of 8.00±0.25 inches and a width 908 substantially in the range of 6.75±0.25 inches, but in other embodiments can have any other known and/or convenient dimensions. In some embodiments, a sweat grip 100 can be configured to wrap around a substantially cylindrical member having a circumference substantially in the range of 5.25±1.25 inches, but in other embodiments can be configured to for any known and/or convenient elongated member.

Figure 10A:
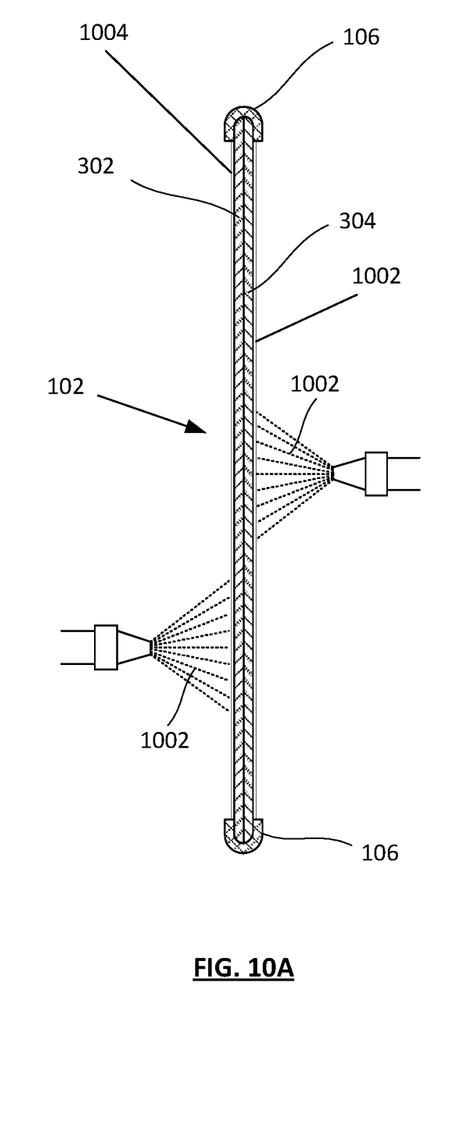
FIGS. 10A and 10B depict still further embodiments of the sweat grip.
Figure 10B:
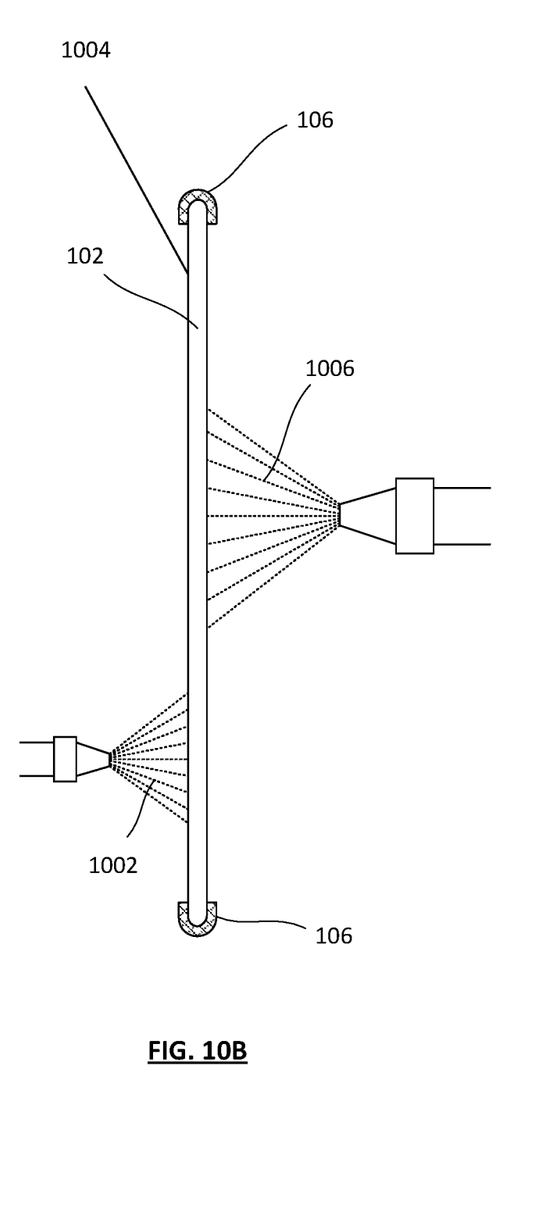

As depicted in FIGS. 10A and 10B, in some embodiments, a sweat grip 100 can further comprise antimicrobial properties. As depicted in FIG. 10A, in some embodiments, a first panel 302, a second panel 304 or both the first panel 302 and second panel 304 can comprise an antimicrobial, anti-viral and/or anti-bacterial layer 1002 1004. In the embodiments depicted in FIG. 10A, the layer 1002 1004 can be applied to the exterior surfaces of the panels 302 304 via sprayer 1006 application. However, in alternate embodiments, the layer 1002 1004 can be applied to the exterior surfaces of the panels 302 304 via any known convenient and/or desired application process.

In the embodiment depicted in FIG. 10B, in some embodiments, a main body 102 and/or panels 302 304 can comprise an antimicrobial, anti-viral and/or anti-bacterial material and/or substance impregnated into a main body 102 and/or panels 302 304 and/or can comprise an antimicrobial, anti-viral and/or anti-bacterial layer 1002 1004. In the embodiment depicted in FIGS. 10A and 10B, the layer 1002 1004 or impregnation can be applied/impregnated in/on to the exterior surfaces of the main body 102 and/or panels 302 304 via sprayer 1006 application. However, in alternate embodiments, the main body 102 and/or panels 302 304 can be impregnated in the exterior surfaces of the main body 102 and/or panels 302 304 via any known convenient and/or desired process. In still further embodiments, a layer 1004 can be applied to one surface of the device 100 and the opposing side can be impregnated with one or more of an antimicrobial, anti-viral and/or anti-bacterial materials. In still further embodiments, one or more the materials of the main body 102 and/or panels 302 304 can be comprised of materials that have inherent antimicrobial, anti-viral and/or anti-bacterial properties.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A sweat grip, comprising:
   a main body consisting of a flexible planar member having an exterior moisture absorbent side and an interior grip side; and
   a fastener on said interior grip side configured to selectively secure said main body in a closed configuration when said fastener is affixed to said interior moisture absorbent side, wherein said main body comprises a moisture absorbent material on said exterior moisture absorbent side and a higher coefficient of friction on said interior grip side than on said exterior moisture absorbent side.

2. The sweat grip of claim 1, further comprising a corresponding fastener on said exterior moisture absorbent side configured to interact with said fastener on said interior grip side.

3. The sweat grip of claim 1, wherein each said fastener is a region of hook-and-loop fastener material.

4. A sweat grip, comprising:
   a main body consisting of a flexible planar member having an exterior moisture absorbent side and an interior grip side, a moisture absorbent material on said exterior moisture absorbent side, a silicone layer on said interior grip side and antimicrobial properties;
   wherein said main body has a length substantially in the range of 8.00±0.25 inches and a width substantially in the range of 6.75±0.25 inches; and
   a hook-and-loop fastener on said interior grip side that is configured to selectively secure said main body in a closed configuration when said hook-and-loop fastener is affixed to said exterior moisture absorbent side.

* * * * *